(12) United States Patent
Sumimoto

(10) Patent No.: US 8,563,106 B2
(45) Date of Patent: Oct. 22, 2013

(54) THERMOPLASTIC RESIN COMPOSITION AND RESIN MOLDING

(75) Inventor: Norifumi Sumimoto, Tokyo (JP)

(73) Assignee: Techno Polymer Co., Ltd., Tokyo (JP)

(*) Notice: Subject to any disclaimer, the term of this patent is extended or adjusted under 35 U.S.C. 154(b) by 0 days.

(21) Appl. No.: 12/780,253

(22) Filed: May 14, 2010

(65) Prior Publication Data
US 2010/0222511 A1 Sep. 2, 2010

Related U.S. Application Data

(62) Division of application No. 11/547,191, filed as application No. PCT/JP2005/005515 on Mar. 25, 2005, now abandoned.

(30) Foreign Application Priority Data

Mar. 31, 2004 (JP) ................................ 2004-106612
Jul. 13, 2004 (JP) ................................ 2004-206385

(51) Int. Cl.
*C08L 77/00* (2006.01)
*C08L 25/08* (2006.01)

(52) U.S. Cl.
USPC .......................... 428/35.7; 428/34.1; 525/167

(58) Field of Classification Search
None
See application file for complete search history.

(56) References Cited

U.S. PATENT DOCUMENTS

| | | |
|---|---|---|
| 5,096,995 A | 3/1992 | Fukumoto et al. |
| 5,616,418 A | 4/1997 | Vasselin et al. |
| 5,780,127 A | 7/1998 | Mikkelsen |
| 5,830,983 A | 11/1998 | Alex et al. |
| 5,886,098 A | 3/1999 | Ueda et al. |
| 5,914,191 A | 6/1999 | Hanson et al. |
| 6,045,919 A | 4/2000 | Alex et al. |
| 6,266,490 B1 | 7/2001 | Mukai et al. |
| 6,284,839 B1 | 9/2001 | Fahey et al. |

(Continued)

FOREIGN PATENT DOCUMENTS

| | | |
|---|---|---|
| EP | 0 937 747 A2 | 8/1999 |
| JP | 08-048768 A | 2/1996 |

(Continued)

OTHER PUBLICATIONS

International Search Report issued on Jun. 7, 2005 in International Application No. PCT/JP2005/005515.

(Continued)

*Primary Examiner* — Monique Jackson
(74) *Attorney, Agent, or Firm* — Fitch, Even, Tabin & Flannery, LLP (57) ABSTRACT

The present invention provides a thermoplastic resin composition producing an extremely small amount of outgas and providing a molded article having excellent antistaticity. The present thermoplastic resin composition comprises a thermoplastic resin and is characterized in that the amount of outgas is 1500 μg/g or less. The composition may comprise a surface resistivity reducing substance in an amount of 0.1 to 70 parts by mass relative to 100 parts by mass of the thermoplastic resin. The present invention is suitable to a composition comprising a styrenic resin as the thermoplastic resin. The surface resistivity reducing substrate is preferably a polyamide elastomer comprising a hard segment formed of polyamide 12 and a soft segment formed of poly(alkylene oxide)glycol. The polyamide elastomer preferably has a refractive index of 1.5 to 1.53, a melting point of 130 to 160° C., a solution viscosity of 1.35 to 1.70 and a surface resistivity of $1 \times 10^8$ to $1 \times 10^{11} \Omega$.

23 Claims, 1 Drawing Sheet

(56) References Cited

U.S. PATENT DOCUMENTS

| | | |
|---|---|---|
| 6,344,513 B1 | 2/2002 | Numata |
| 6,586,041 B1 | 7/2003 | Ibar |
| 6,624,250 B2 | 9/2003 | Zimmerman |
| 6,797,804 B2 | 9/2004 | Abe |
| 6,951,340 B2 | 10/2005 | Suzuki et al. |
| 6,952,327 B1 | 10/2005 | Kikuchi et al. |
| 2004/0170918 A1 | 9/2003 | Mae-Sawa |
| 2004/0041355 A1 | 3/2004 | Suzuki et al. |
| 2005/0049360 A1* | 3/2005 | Okamoto ................ 525/88 |

FOREIGN PATENT DOCUMENTS

| | | |
|---|---|---|
| JP | H08-048768 A | 2/1996 |
| JP | 11-003932 A | 1/1999 |
| JP | 11240995 A | 9/1999 |
| JP | 2000-136295 A | 5/2000 |
| JP | 2001-118224 A | 4/2001 |
| JP | 2002-173603 A | 6/2002 |
| JP | 2003-118776 A | 4/2003 |
| JP | 2004002488 A | 1/2004 |
| JP | 2004-090609 A | 3/2004 |
| JP | 2002-121402 A | 4/2004 |
| JP | 2005-112883 A | 4/2005 |
| WO | WO 01/44400 A1 | 6/2001 |
| WO | WO 03/007079 | 1/2003 |
| WO | WO 03/033377 A1 | 4/2003 |

OTHER PUBLICATIONS

English translation of International Preliminary Report on Patentability issued on Oct. 26, 2006 in International Application No. PCT/JP2005/005515.

English translation of Chinese Office Action issued on Jun. 5, 2009 in Chinese Application No. 200580012762.2.

Office Action in European Application 2005-088321, dated Jun. 6, 2011.

Office Action in European Application 05 727 146.2-2109, dated Apr. 7, 2011.

Office Action in Japanese Application 2005-088321, apparently dated Jun. 7, 2011.

European Office Action issued against European Patent Application No. 05 727 146.2.

Taiwanese Office Action for corresponding Taiwan Patent Application, 4 pages, entire document (no English language translation available).

Korean Office Action, dated Jul. 20, 2011, corresponding with Korean Patent Application 10-2006-7019983 (English Translation unavailable).

Office Action, apparently dated Nov. 30, 2010, corresponding with Japanese Patent Application 2005-088321. (English Translation unavailable).

* cited by examiner

THERMOPLASTIC RESIN COMPOSITION AND RESIN MOLDING

CROSS-REFERENCE TO RELATED APPLICATIONS

This application is a divisional of U.S. application Ser. No. 11/547,191, filed Sep. 29, 2006, which is a National Phase Entry of International Application No. PCT/JP2005/005515 filed Mar. 25, 2005, which claimed priority to Japanese Patent Application No. 2004-106612, filed Mar. 31, 2004; and Japanese Patent Application No. 2004-206385, filed Jul. 13, 2004. The complete disclosures of all applications are incorporated herein by reference.

TECHNICAL FIELD

The present invention relates to a thermoplastic resin composition which generates an extremely small amount of outgas and provides molded articles excellent in antistaticity, abrasion resistance, impact resistance and transparency, and also relates to a molded article made of the thermoplastic resin composition. More particularly, the present invention relates to a thermoplastic resin composition which is highly purified more than ever by removing impurities such as monomers used in resin production and, as a result, reduced in outgas generation, and also relates to a molded article thereof. Most particularly, the present invention relates to a thermoplastic resin composition which is blended with a specific substance for reducing a surface resistivity and is thus extremely reduced in outgas generation, and also relates to a molded article thereof.

BACKGROUND ART

Recently, with progress of the chemical industry, industrial materials having chemically and physically excellent properties have been demanded in the market. Particularly in the electric/electronic field, a highly purified resin is desired. However, it is recently pointed out that gas (so-called "outgas"), which is vaporized from plastic containers for housing or transporting electric/electronic parts, damages the electric/electronic parts housed in the containers, and that when a resin is molded, the outgas is also generated and contaminates molds, thereby degrading appearance of the resultant molded articles.

Accordingly, highly purified resins such as of polypropylene, polycarbonate and polybutylene terephthalate are used as resins for use in forming wafer boxes used in transportation of semiconductor wafers and so on, chip trays used in transportation or processing of semiconductor chips, or the like. Some resins that are easy to be electrostatically charged often cause electrostatic trouble, and have a limitation to the aforementioned uses.

On the other hand, styrenic resins such as ABS resins have been widely used in the fields of electrics or electronics, household electrical appliances and automobiles, since they are excellent in moldability and physical and mechanical properties. However, styrenic resins also have the above-mentioned problems of outgas generation and electrostatic trouble.

Generally, resins contain residual impurities such as unreacted monomers, oligomers, solvents, compounds blended as auxiliary agents and compounds derived from the auxiliary agents. These impurities are considered to constitute outgas. Therefore, in order to reduce the outgas generation, it is considered that these impurities must be removed. As methods for purifying resins by removing impurities, various methods are known. For example, mention may be made of a method in which volatile substances are stripped from an aqueous dispersion of a polymer substance (see Patent Document 7 below); a method in which monomers are vaporized by dividing latexes into small droplets and supplying them with steam (see Patent Document 8 below); and a method in which heat treatment is carried out under reduced pressure to remove monomers from latexes whilst steam is passed through a tank to form a thin film of steam on the wall surface of the tank (see Patent Document 9 below). However, in these methods, resins are exposed to high temperature for a long time, thereby occasionally decreasing in quality.

On the other hand, as a method for overcoming the problem of electrostatic trouble, kneading an antistatic agent into a resin is generally known. However, this method has a drawback in that the antistatic effect does not last long so that the surface resistivity value increases with time. To improve sustainability of the antistatic effect, a method in which a polyamide elastomer is blended with a styrenic rein such as an ABS resin has been proposed (see Patent Documents 2, 3, 4, and 6 below). It is also known that lithium compounds are used as antistatic agents that can be blended with styrenic resins to further improve antistaticity (see Patent Documents 1 and 5 below).

Although these approaches make it possible to fairly improve the antistaticity of styrenic resins, still higher antistaticity is recently demanded in the electric/electronic field. In addition, a styrenic resin highly reduced in outgas generation is also required. This is the case for resins other than styrenic resins.

Patent Document 1: Japanese Patent Laid-Open No. H05-163402
Patent Document 2: Japanese Patent Laid-Open No. H05-163441
Patent Document 3: Japanese Patent Laid-Open No. H06-107884
Patent Document 4: Japanese Patent Laid-Open No. H06-220274
Patent Document 5: Japanese Patent Laid-Open No. H08-109327
Patent Document 6: Japanese Patent No. 3386612
Patent Document 7: Japanese Patent Laid-Open No. S50-58184
Patent Document 8: Japanese Patent Publication No. S43-6065
Patent Document 9: Japanese Patent Publication No. S44-844

DISCLOSURE OF THE INVENTION

Problems to be Solved by the Invention

The present invention was made in view of the aforementioned circumstances. An object of the present invention is to provide a thermoplastic resin composition which is highly purified more than before by removing impurities such as unreacted monomers and is extremely small in outgas generation, and to provide a molded article thereof.

Another object of the present invention is to provide a thermoplastic resin composition which gives a molded article that generates an extremely small amount of outgas and has excellent antistaticity, abrasion resistance, impact resistance and transparency, and provide a molded article thereof.

Means for Solving the Problems

The present inventors have conducted intensive studies to attain the aforementioned objects. As a result, they found that when the amount of outgas released from a thermoplastic resin composition is 1500 µg/g or less, a container for electric/electronic parts, which has no negative effect upon semiconductor wafers, can be provided. Thus, the present invention was accomplished.

According to an aspect of the present invention, there is provided a thermoplastic resin composition comprising a thermoplastic resin (A) characterized in that it has outgas in an amount of 1500 µg/g or less.

It is preferable that the thermoplastic resin composition of the present invention further comprises a substance (B) for reducing a surface resistivity, in an amount of 0.1 to 70 parts by mass relative to 100 parts by mass of the thermoplastic resin (A).

According to a preferred embodiment of the present invention, the thermoplastic resin composition of the present invention in which the thermoplastic resin (A) comprises a styrenic resin.

In the present invention, it is preferable that the surface resistivity reducing substance is a polyamide elastomer which comprises a hard segment comprising polyamide 12 and a soft segment comprising poly(alkylene oxide)glycol. By blending such a polyamide elastomer with a thermoplastic resin, the thermoplastic resin can be reduced in content of all-volatile substances to a predetermined amount or less. As a result, the thermoplastic resin is not only reduced in outgas generation but also remarkably improved in antistaticity whilst being kept good in abrasion resistance, impact resistance and transparency.

It is preferable that the polyamide elastomer mentioned above has a refractive index of 1.5 to 1.53, a melting point of 130 to 160° C., a solution viscosity of 1.35 to 1.70 and a surface resistivity of $1\times10^8$ to $1\times10^{11}\Omega$.

According to another aspect of the present invention, there is provided an antistatic agent comprising a polyamide elastomer which comprises a hard segment comprising polyamide 12 and a soft segment comprising poly(alkylene oxide) glycol, characterized in that the polyamide elastomer has a refractive index of 1.5 to 1.53, a melting point of 130 to 160° C., a solution viscosity of 1.35 to 1.70 and a surface resistivity of $1\times10^8$ to $1\times10^{11}\Omega$.

According to still another aspect of the present invention, there is provided a resinous molded article which is formed of the thermoplastic resin composition according to the present invention and has a surface resistivity of $1\times10^{11}\Omega$ or less.

It is preferable that the resinous molded article has a taber abrasion index of less than 30.

The resinous molded article according to the present invention is suitably used as a container that receives at least one selected from the group consisting of a semiconductor related component, a semiconductor related device, a liquid crystal related component and a liquid crystal related device.

Effects of the Invention

A thermoplastic resin composition according to the present invention is highly purified and generates outgas in an amount of 1500 µg/g or less. Therefore, the thermoplastic resin composition can be preferably used as a molding material for various types of resinous molded articles such as containers that receive semiconductor related components and the like. The impurities contained in the composition have little negative effect upon the parts received in the container. In addition, since the abrasion resistance of the container is improved, there is no possibility that dust is generated from the container.

Furthermore, when it contains a surface resistivity reducing substance such as a polyamide elastomer in an amount of 0.1 to 70 parts by mass relative to 100 parts by mass of the thermoplastic resin composition such as a styrenic resin, the amount of outgas can be easily reduced to 1500 µg/g or less and further to 1000 µg/g or less; at the same time, the surface resistivity value can be reduced to $1\times10^{11}\Omega$ or less. Thus, attachment of dust and the like to resinous molded articles can be sufficiently suppressed. Also in this case, abrasion resistance, impact resistance and transparency can be maintained well. Hence, thermoplastic resin compositions and resinous molded articles suitably used in the electric/electronic field can be provided.

Also in the case where the polyamide elastomer has a refractive index of 1.5 to 1.53, a melting point of 130 to 160° C., a solution viscosity of 1.35 to 1.7 and a surface resistivity of $1\times10^8$ to $1\times10^{11}\Omega$, attachment of dust and the like to resinous molded articles can be sufficiently suppressed and abrasion resistance, impact resistance and transparency can be maintained well.

Furthermore, resinous molded articles formed of the thermoplastic resin composition according to the present invention can be reduced in surface resistivity value as low as $1\times10^{11}\Omega$ or less and thus the attachment of dust and the like to the resinous molded articles can be sufficiently suppressed.

Moreover, when the taber abrasion index of the resinous molded article is less than 30, abrasion of the resinous molded article can be suppressed even if it is moved.

In addition, when the resinous molded article is used as a container receiving at least one of a semiconductor related component, a semiconductor related device, a liquid crystal related component and a liquid crystal related device, contamination of these components and devices with outgas can be suppressed.

BEST MODE FOR CARRYING OUT THE INVENTION

The present invention will be explained in details below.

Note that the terms "(co)polymerization" and "(co)polymer" used herein refer to "homopolymerization" and/or "copolymerization" and "homopolymer" and/or "copolymer", respectively. The terms "(meth)acryl" and "(meth)acrylate" refer to "acryl" and/or "methacryl" and "acrylate" and/or "methacrylate", respectively.

Examples of the thermoplastic resin (A) of the present invention include, for example, styrenic resins, polyolefin resins such as polypropylene and polyethylene, polyester resins such as polybutylene terephthalate and polyethylene terephthalate, polyamide resins such as nylon 6, nylon 66 and nylon 46, polycarbonate resins, polyvinylchloride resins, polyvinylidene chloride resins, fluorine resins, polyvinylidene fluoride polymers, ethylene-vinyl acetate copolymers, polysulfones, polyether sulfones, polyphenylene sulfides, liquid crystal polymers and acylate resins. These polymers may be used singly or in combination of two or more.

Of them, the present invention is particularly suitable for application to a thermoplastic resin (A) containing a styrenic resin. When the styrenic resin is blended with another type of resin, the content of the latter resin is preferably 5 to 200 parts by mass, and more preferably 5 to 150 parts by mass, relative to 100 parts by mass of the styrenic resin.

The styrenic resin encompasses a rubber-reinforced resin (A1) and/or a copolymer (A2).

The rubber-reinforced resin (A1) can be obtained by polymerizing a vinyl monomer (b) comprising an aromatic vinyl compound and optionally another vinyl monomer copolymerizable with the aromatic vinyl compound, in the presence of a rubber-like polymer (a).

The copolymer (A2) can be obtained by polymerizing a vinyl monomer (b) comprising an aromatic vinyl compound and optionally another vinyl monomer copolymerizable with the aromatic vinyl compound, in the absence of a rubber-like polymer (a).

Examples of the rubber-like polymer (a) include polybutadiene, polyisoprene, butyl rubber, styrene-butadiene copolymer (content of styrene is preferably 5 to 60% by mass), styrene-isoprene copolymer, acrylonitrile-butadiene copolymer, ethylene-α-olefin copolymer, ethylene-α-olefin-polyene copolymer, silicone rubber, acrylic rubber, butadiene-(meth)acrylate copolymer, polyisoprene, styrene-butadiene block copolymer, styrene-isoprene block copolymer, hydrogenated styrene-butadiene block copolymer, hydrogenated butadiene polymer, and ethylenic ionomer. The styrene-butadiene block copolymer and styrene-isoprene block copolymer include those having AB type, ABA type, taper type and radial-teleblock type structures. Furthermore, the hydrogenated butadiene polymer includes not only hydrogenated products of the above-mentioned block copolymers but also hydrogenated products of a polystyrene block and a styrene-butadiene random copolymer block, and hydrogenated products of a polymer composed of a polybutadiene block with 1,2-vinyl bond content of not more than 20% by mass and a polybutadiene block with 1,2-vinyl bond content of more than 20% by mass. As the rubber-like polymer (a), polybutadiene, ethylene-α-olefin copolymer and the like are frequently used. These rubber-like polymers (a) may be used singly or in a combination of two or more.

When the component (a) is obtained by emulsion polymerization, gel content of the rubber-like polymer is not particularly limited; however, the gel content is preferably not more than 98% by mass, and more preferably 40 to 98% by mass. If the gel content is within this range, it is possible to obtain a thermoplastic resin composition capable of providing molded articles having excellent impact resistance particularly.

Note that the gel content can be obtained in the following manner. One (1) gram of the rubber-like polymer is added to 100 ml of toluene. The mixture is allowed to stand still at room temperature for 48 hours, and is then filtrated through a 100-mesh metal screen (the mass is defined as $W_1$ g). The filtrated insoluble matter in toluene and the metal screen are dried at 80° C. for 6 hours in vacuum and weighed (the mass is defined as $W_2$ g). The gel content is obtained in accordance with the following equation (1):

$$\text{Gel content (\% by mass)} = [\{W_2(g) - W_1(g)\}/1(g)] \times 100 \quad (1)$$

The gel content is controlled by appropriately specifying type and amount of a molecular-weight adjusting agent, polymerization time, polymerization temperature and polymerization conversion, when the rubber-like polymer is produced.

As an aromatic vinyl compound constituting the vinyl monomer (b), mention may be made of styrene, α-methylstyrene, p-methylstyrene, hydroxystyrene and a halogenated styrene such as bromostyrene. These may be used singly or in combination of two or more. Of them, styrene and α-methylstyrene are preferable.

As the other vinyl monomer that is copolymerizable with the aromatic vinyl compound, mention may be made of a vinyl cyanide compound, a (meth)acrylate compound, a maleimide compound and various other functional group containing unsaturated compounds. A preferable vinyl monomer (b) contains an aromatic vinyl compound as an essential monomer component, to which one or two or more types of compounds selected from the group consisting of a vinyl cyanide compound, a (meth)acrylate compound and a maleimide compound are optionally added as a monomer component. Furthermore, if necessary, at least one of the various other functional group containing unsaturated compounds may be used together as the monomer component. Examples of the various other functional group containing unsaturated compounds include an unsaturated acid compound, an epoxy group containing unsaturated compound, a hydroxy group containing unsaturated compound, an oxazoline group containing unsaturated compound, an acid anhydride group containing unsaturated compound and a substituted or unsubstituted amino group containing unsaturated compound. The various other functional group containing unsaturated compounds mentioned above may be used singly or in a combination of two or more.

Examples of the vinyl cyanide compound used herein include acrylonitrile and methacrylonitrile. They may be used singly or in combination of two or more. When a vinyl cyanide compound is used, chemical resistance is imparted. The vinyl cyanide compound may be used generally in an amount of 10 to 40% by mass and preferably 15 to 35% by mass relative to 100% by mass of the total of the component (b). When a high-level chemical resistance is required, the amount of the vinyl cyanide compound is 20 to 60% by mass and preferably 25 to 50% by mass. When outgas is desired to be suppressed extremely low, the amount of the vinyl cyanide compound is 0 to 15% by mass and preferably 0 to 10% by mass.

As the (meth)acrylate compound, for example, an alkyl (meth)acrylate may be mentioned. Specific examples thereof include acrylates such as methyl acrylate, ethyl acrylate, propyl acrylate, butyl acrylate, hexyl acrylate, octyl acrylate and 2-ethylhexyl acrylate, and methacrylates such as methyl methacrylate, ethyl methacrylate, propyl methacrylate, butyl methacrylate, hexyl methacrylate, octyl methacrylate and 2-ethylhexyl methacrylate. They may be used singly or in a combination of two or more. Use of a (meth)acrylate compound is advantageous in that transparency is imparted, and surface hardness is improved. A (meth)acrylate compound is preferably used in an amount of 1 to 93% by mass, more preferably 2 to 85% by mass, and most preferably 5 to 80% relative to 100% by mass of the total of the component (b). Note that, to impart transparency, the refractive indexes of component (a) and component (b) of Component (A1) and component (A2) are all set at an equal or close value. For example, when a diene rubber polymer such as polybutadiene is used as component (a), the amount of (meth)acrylate compound is preferably 30 to 95% by mass, more preferably 40 to 90% by mass, and most preferably 50 to 85% by mass relative to 100% by mass of the total of the component (b).

Examples of the maleimide compound include maleimide compounds derived from α- and β-unsaturated dicarboxylic acids such as maleimide, N-methylmaleimide, N-butylmaleimide, N-phenylmaleimide and N-cyclohexylmaleimide. They may be used singly or in combination of two or more. To introduce a maleimide unit, maleic anhydride may be copolymerized and thereafter imidized. When a maleimide compound is used, thermal resistance is imparted. The maleimide compound is used preferably in an amount of 1 to 60% by mass, and more preferably 5 to 50% by mass relative to 100% by mass of the total of the component (b).

Examples of the unsaturated acid compound include acrylic acid, methacrylic acid, ethacrylic acid, maleic acid, fumaric acid, itaconic acid, crotonic acid, and cinnamic acid. They may be used singly or in combination of two or more.

Examples of the epoxy group containing unsaturated compound include glycidyl acrylate, glycidyl methacrylate and alkylglycidyl ether. They may be used singly or in a combination of two or more.

Examples of the hydroxy group containing unsaturated compound include hydroxystyrene, 3-hydroxy-1-propene, 4-hydroxy-1-butene, cis-4-hydroxy-2-butene, trans-4-hydroxy-2-butene, 3-hydroxy-2-methyl-1-propene, 2-hydroxyethylmethacrylate, 2-hydroxyethylacrylate, and N-(4-hydroxyphenyl)maleimide. They may be used singly or in combination of two or more.

Examples of the oxazoline group containing unsaturated compound include vinyl oxazoline. They may be used singly or in combination of two or more.

Examples of the acid anhydride group containing unsaturated compound include maleic anhydride, itaconic anhydride and citraconic anhydride. They may be used singly or in combination of two or more.

Examples of the substituted or unsubstituted amino group containing unsaturated compound include aminoethyl acrylate, propylaminoethyl acrylate, aminomethyl methacrylate, aminoethyl methacrylate, aminopropyl methacrylate, dimethylaminoethyl methacrylate, phenylaminoethyl methacrylate, N-vinyldiethylamine, N-acetylvinylamine, acrylamine, methacrylamine, N-methylacrylamine, acrylamide, methacrylamide, N-methylacrylamide, p-aminostyrene and other aminostyrenes. They may be used singly or in combination of two or more.

When a functional group containing unsaturated compound as mentioned above is used in a blend of a styrenic resin and another polymer, compatibility of them can be improved. As a monomer for attaining such an effect, mention is preferably made of an epoxy group containing unsaturated compound, a carboxyl group containing unsaturated compound and a hydroxy group containing unsaturated compound, more preferably a hydroxy group containing unsaturated compound, and most preferably 2-hydroxylethyl(meth)acrylate.

Various other functional group containing unsaturated compounds as mentioned above are preferably used in a total amount of 0.1 to 20% by mass, and more preferably 0.1 to 10% by mass, relative to 100% by mass of the total of the component (b).

Amount of monomers other than the aromatic vinyl compound in the vinyl monomer (b) is generally 98% by mass, preferably 5 to 95% by mass, more preferably 10 to 80% by mass, further more preferably 10 to 60% by mass, and most preferably 10 to 40% by mass based on 100% by mass of the total of the vinyl monomer (b). Examples of the combination of monomers constituting the vinyl monomer (b) include (i) aromatic vinyl compound/vinyl cyanide compound, (ii) aromatic vinyl compound/(meth)acrylate compound, (iii) aromatic vinyl compound/vinyl cyanide compound/(meth)acrylate compound, (iv) aromatic vinyl compound/maleimide compound/vinyl cyanide compound, and (v) aromatic vinyl compound/2-hydroxylethyl(meth)acrylate/vinyl cyanide compound. More preferable combination of monomers constituting the vinyl monomer (b) include styrene/acrylonitrile, styrene/methyl methacrylate, styrene/acrylonitrile/methyl methacrylate, styrene/acrylonitrile/glycidyl methacrylate, styrene/acrylonitrile/2-hydroxyethylmethacrylate, styrene/acrylonitrile/(meth)acrylate, styrene/N-phenylmaleimide, and styrene/methyl methacrylate/cyclohexylmaleimide. The most preferable combination of monomers to be polymerized in the presence of a rubber-like polymer (a) include styrene/acrylonitrile in a ratio (by mass) of 65/45 to 90/10, styrene/methyl methacrylate in a ratio (by mass) of 80/20 to 20/80, styrene/acrylonitrile/methyl methacrylate in which the amount of styrene falls within a range of 20 to 80% by mass, and the total of acrylonitrile and methyl methacrylate falls within a range of 20 to 80% by mass.

The composition (A1) can be produced by a known polymerization method such as emulsion polymerization, bulk polymerization, solution polymerization, suspension polymerization and a combination of these. Of them, preferable polymerization methods for the composition (A1) include emulsion polymerization and solution polymerization.

When the emulsion polymerization is employed, known polymerization initiators, chain transfer agents and emulsifiers, etc. may be used.

Examples of the polymerization initiator include cumen hydroperoxide, p-menthane hydroperoxide, diisopropylbenzene hydroperoxide, tetramethylbutyl hydroperoxide, tert-butyl hydroperoxide, potassium persulfate and azobisisobutyronitrile.

Redox system is preferable as the polymerization initiator by using various reducing agents, a sugar-containing iron pyrophosphate formulation and a sulfoxylate formulation.

Examples of the chain transfer agent include octyl mercaptan, n-dodecyl mercaptan, t-dodecyl mercaptan, n-hexyl mercaptan and terpinolene.

Examples of the emulsifier include an alkylbenzene sulfonate such as sodium dodecylbenzene sulfonate, an aliphatic sulfonate such as sodium lauryl sulfate, a higher aliphatic acid salt such as potassium laurate, potassium stearate, potassium oleate and potassium palmitate, and a rosin acid salt such as potassium rosinate.

Note that, the emulsion polymerization may be performed by using a rubber-like polymer (a) and a vinyl monomer (b) in the following manner. Polymerization may be performed by adding the vinyl monomer (b) entirely, intermittently, or continuously to the entire amount of the rubber-like polymer (a). Alternatively, part of the rubber-like polymer (a) may be added during a polymerization.

After the emulsion polymerization, the obtained latex is usually coagulated by a coagulating agent, washed with water and dried to give a component (A1) of the present invention as powder. In this instance, two or more types of latexes obtained by emulsion polymerization as the component (A1) may be appropriately blended and then coagulated. As the coagulating agent used herein, mention may be made of an inorganic salt such as calcium chloride, magnesium sulfate and magnesium chloride, and an acid such as sulfuric acid, hydrochloric acid, acetic acid, citric acid and malic acid.

The solvent that can be used in producing a component (A1) by solution polymerization is an inert polymerization solvent usually used in radical polymerization. Examples thereof include aromatic hydrocarbons such as ethyl benzene and toluene, ketones such as methylethyl ketone and acetone, acetonitrile, dimethylformamide and N-methylpyrrolidone.

Polymerization temperature preferably falls within the range of 80 to 140° C., and more preferably 85 to 120° C.

In polymerization, a polymerization initiator may be used. Alternatively, polymerization may be performed by thermal polymerization without using a polymerization initiator. Preferable examples of the polymerization initiator include organic peroxides such as ketone peroxide, dialkyl peroxide, diacyl peroxide, peroxy ester, hydroperoxide, azobisisobutyronitrile and benzoyl peroxide.

When a chain transfer agent is used, mercaptans, terpinolenes and α-methylstyrene dimers may be used.

When bulk polymerization and suspension polymerization are employed, polymerization initiators and chain transfer agents as explained in the section of solution polymerization may be used.

The polymer obtained by polymerizing a vinyl monomer (b) in the presence of a rubber-like polymer (a) generally contains copolymers in which the vinyl monomer (b) is grafted to the rubber-like polymer (a) and ungrafted components of vinyl monomer (b) (i.e., (co)polymers of vinyl monomers (b), which are not grafted to the rubber-like polymer (a)).

Graft ratio of the component (A1) is preferably 5 to 200% by mass, more preferably 20 to 200% by mass, further more preferably 30 to 150% by mass, and most preferably 40 to 120% by mass. The graft ratio can be obtained in accordance with the following Equation (2).

$$\text{Graft ratio (\% by mass)} = \{(T-S)/S\} \times 100 \tag{2}$$

In the Equation (2), T represents the mass (g) of insoluble matter obtained by adding 1 g of a component (A1) to 20 ml of acetone (acetonitrile is used in the case where acrylic rubber is used as the rubber-like polymer (a)), shaking the mixture by a shaker for 2 hours, spinning for 60 minutes by a centrifuge (at a rotation speed of 23,000 rpm), thereby separating the insoluble matter from soluble matter; and S represents the mass (g) of a rubber-like polymer contained in 1 g of the component (A1).

Limiting viscosity [η] of the soluble matter of the component (A1) in acetone (acetonitrile in the case where acrylic rubber is used as the rubber-like polymer (a)), which is measured at 30° C. using methyl ethyl ketone as a solvent, is generally 0.2 to 1.5 dl/g, preferably 0.2 to 1.2 dl/g, further preferably 0.2 to 1.0 dl/g, and most preferably 0.3 to 0.8 dl/g.

Average size of particles of the grafted rubber-like polymer dispersed in the component (A1) preferably falls within the range of 500 to 30,000 Å, more preferably 1,000 to 20,000 Å, and most preferably 1,500 to 8,000 Å. The average particle size can be determined by known electron microscopic methods.

The amount of the rubber-like polymer (a) to be used is generally 3 to 90% by mass, preferably 3 to 80% by mass, and from the viewpoint of impact resistance, preferably 3 to 70% by mass, more preferably 5 to 60% by mass, and most preferably 10 to 40% by mass relative to 100% by mass of the entire component (A1). From the viewpoint of impact resistance, the ratio of the rubber-like polymer (a) to the entire thermoplastic resin composition (A) according to the present invention is preferably 1 to 50% by mass, more preferably 3 to 40% by mass, further more preferably 5 to 30% by mass, and most preferably about 10 to 20% by mass relative to 100% by mass of the entire thermoplastic resin composition (A).

In the present invention, the styrenic resin may comprise the component (A1) alone, the component (A2) alone or a mixture of the component (A1) and the component (A2). To reduce the amount of outgas, it is often preferred that the styrenic resin comprises the component (A1) alone, and particularly in the case where an aromatic vinyl compound and a (meth)acrylate compound are used in combination as a vinyl monomer (b), the styrenic resin preferably comprises the component (A1) alone. Even when the styrenic resin comprises the component (A1) alone in this way, the rubber-like polymer (a) is used in the same amount as mentioned above.

As an example of a vinyl monomer (b) constituting the copolymer of the component (A2), mention may be made of all compounds exemplified as the vinyl monomer (b) above, such as an aromatic vinyl compound, a vinyl cyanide compound, a (meth)acrylate compound, a maleimide compound and other various functional group containing unsaturated compounds. These compounds may be used singly or in combination of two or more. Generally, an aromatic vinyl compound is used as an essential monomer component. In addition to this, if necessary, one or two or more monomers selected from the group consisting of a vinyl cyanide compound, a (meth)acrylate compound and a maleimide compound can be used as a monomer component in combination. Furthermore, if necessary, at least one type of other various functional group containing unsaturated compounds may be used as a monomer component in combination.

When the rubber-reinforced resin is blended with another polymer, an epoxy group containing unsaturated compound, a carboxyl group containing unsaturated compound or a hydroxy group containing unsaturated compound is preferably used as the functional group containing unsaturated compound to improve compatibility of both the rubber-reinforced resin and the polymer, and among them, the hydroxy group containing unsaturated compound is more preferable, and 2-hydroxylethyl(meth)acrylate is most preferable.

Preferable amount of the aromatic vinyl compound, the vinyl cyanide compound, the (meth)acrylate compound and the maleimide compound to be used in the component (A2) is the same as that of the vinyl monomer (b) in the component (A1) although it may be different.

Preferable combinations of monomers constituting the copolymer (A2) include (i) aromatic vinyl compound/vinyl cyanide compound, (ii) aromatic vinyl compound/alkyl (meth)acrylate, (iii) aromatic vinyl compound/vinyl cyanide compound/alkyl(meth)acrylate, (iv) aromatic vinyl compound/maleimide compound/vinyl cyanide compound and (v) aromatic vinyl compound/2-hydroxylethyl(meth)acrylate/vinyl cyanide compound.

The copolymer (A2) can be produced in the same manner as the rubber-reinforced resin (A1) except that the vinyl monomer (b) is polymerized in the absence of a rubber-like polymer. Preferable polymerization methods include bulk polymerization, solution polymerization, suspension polymerization and emulsion polymerization.

The copolymer (A2) may be a copolymer having a single composition or a blend of two or more copolymers different in composition.

Intrinsic viscosity of the copolymer (A2) (measured in a methylethyl ketone at 30° C.) is generally 0.2 to 1.5, preferably 0.3 to 1.3 dl/g, more preferably 0.4 to 1.0 dl/g, and most preferably 0.4 to 0.8 dl/g. The intrinsic viscosity can be controlled by chain transfer agents, polymerization time, polymerization temperature, or the like.

The components (A1) and (A2) are used generally in the form of powder or pellet. When the components (A1) and (A2) are used as a mixture, methods of mixing them are not particularly limited. The components (A1) and (A2), each of which may be in powder form or pellet form, may be dry-blended. Furthermore, the components (A1) and (A2), each of which may be in powder form or pellet form, may be mixed by melt-kneading by use of a kneading roller, kneader, or extruder. Moreover, they are dry-blended and thereafter melt-kneaded. Note that when powders or pellets are mixed, the following component (B), another resin or an additive such as an antioxidant may be added. The mixing and the molding into an article may be performed in series or performed separately in discrete steps.

According to the present invention, the surface resistivity of the thermoplastic resin composition can be reduced by blending a surface resistivity reducing substance (B) with the composition. As the surface resistivity reducing substance, mention may be made of a polyamide elastomer, a polyester elastomer, a conductive carbon black and a conductive carbon fiber. Note that in the cases where a polyamide elastomer and a polyester elastomer are used, the surface resistivity can be further reduced by adding a lithium compound such as lithium chloride and lithium bromide. As the surface resistivity reducing substance, a polyamide elastomer and a polyester elastomer are preferable and a polyamide elastomer is most preferable. These surface resistivity reducing substances may be used singly or in a combination of two or more.

Addition amount of the surface resistivity reducing substance (B) is generally 0.1 to 70 parts by mass, preferably 1 to 60 parts by mass, more preferably 2 to 50 parts by mass and most preferably 5 to 40 parts by mass relative to 100 parts by mass of a thermoplastic resin (A). When the amount of component (B) is less than 0.1 parts by mass, the effect of reducing the surface resistivity or antistatic performance may be insufficient. On the other hand, when the amount exceeds 70 parts by mass, rigidity may decrease.

As the polyamide elastomer to be used as a component (B) in the present invention, mention is typically made of a block copolymer comprising a hard segment (X) formed of a polyamide and a soft segment (Y) formed of a poly(alkylene oxide) glycol.

The polyamide component to be used as the hard segment (X) is not particularly limited and, for example, include a polyamide generated by reaction between a diamine and a dicarboxylic acid; a polyamide generated by ring-opening polymerization of a lactam; a polyamide generated by reaction of an aminocarboxylic acid, a polyamide formed by copolymerization of monomers to be used for generation of the above polyamides; and a mixture of these polyamides.

Examples of the polyamide generated by reaction between a diamine and a dicarboxylic acid include polyamides generated by reaction between an aliphatic diamine, an alicyclic diamine or an aromatic diamine, such as ethylenediamine, tetramethylenediamine, hexamethylenediamine, decamethylenediamine, dodecamethylenediamine, 2,3,4- or 2,4,4-trimethylhexamethylenediamine, 1,3- or 1,4-bis(aminomethyl)cyclohexane, bis(p-aminocyclohexyl)methane, m-xylylenediamine and p-xylylenediamine, with an aliphatic dicarboxylic acid, an alicyclic dicarboxylic acid or aromatic dicarboxylic acid, such as adipic acid, suberic acid, sebacic acid, cyclohexane dicarboxylic acid, terephthalic acid and isophthalic acid. Examples of the polyamide include a nylon mn salt where a (m+n) value is 12 or more. Specific examples thereof include nylon 6,6, nylon 6,10, nylon 6,12, nylon 11,6, nylon 11,10, nylon 12,6, nylon 11,12, nylon 12,6, nylon 12,10, and nylon 12,12 salts.

As the polyamide generated by ring-opening polymerization of a lactam, mention may be made of a polyamide generated by ring-opening polymerization of a lactam having not less than 6 carbon atoms. Examples of the lactam having not less than 6 carbon atoms include caprolactam and laurolactam.

As the polyamide generated by reaction of an aminocarboxylic acid include a polyamide obtained by reaction of an aminocarboxylic acid having not less than 6 carbon atoms. Examples of the aminocarboxylic acid having not less than 6 carbon atoms include ω-amino caproic acid, ω-aminoenan acid, ω-aminocapryl acid, ω-aminobergon acid, ω-amino capric acid, 11-aminoundecanic acid and 12-aminododecanic acid.

Molecular weight of the hard segment (X) is not particularly limited; however preferably 500 to 10,000, in particular 500 to 5,000 in terms of number average molecular weight. Furthermore, the hard segment (X) may be linear or branched.

In the present invention, a hard segment (X) formed of polyamide 12 is preferably used since it not only reduces the surface resistivity but also easily reduces harmful outgas in a thermoplastic resin. As the hard segment (X) formed of polyamide 12, mention may be made of a polyamide derived from ring-opening polymerization of a lactam and a polyamide derived from an aminocarboxylic acid.

As the polyamide derived from ring-opening polymerization of a lactam, mention may be made of a polyamide derived from ring-opening polymerization of a lactam having 12 carbon atoms. As the lactam having 12 carbon atoms, laurolactam may be specifically mentioned.

As the polyamide derived from an aminocarboxylic acid, mention may be made of a polyamide obtained by reaction of an aminocarboxylic acid having 12 carbon atoms. As the aminocarboxylic acid having 12 carbon atoms, mention may be made of 12-aminododecanic acid specifically.

As the poly(alkylene oxide)glycol component to be used as the soft segment (Y), mention may be made of polyethylene glycol, poly(1,2 or 1,3-propyleneoxide)glycol, poly(tetramethyleneoxide)glycol, poly(hexamethyleneoxide)glycol, polyethylene oxide, polypropylene oxide, a block or random copolymer between ethylene oxide and propylene oxide, a block or random copolymer between ethylene oxide and tetrahydrofuran and an alkylene oxide adduct of a bisphenol such as bisphenol A. Of these glycols, polyethylene glycol and ethylene oxide adducts of bisphenols are preferable since they have excellent antistatic properties. Note that poly(alkylene oxide)glycol may have both ends aminated and carboxylated. The soft segment (Y) may be linear or branched.

The hard segment (X) can be bonded with the soft segment (Y) by ester bond or amide bond according to the end of the soft segment (Y). During the bonding reaction, a third component such as a dicarboxylic acid and a diamine may be used.

As the dicarboxylic acid to be used as the third component, mention may be typically made of an aromatic, alicyclic or aliphatic dicarboxylic acid. As the aromatic dicarboxylic acid, one having 4 to 20 carbon atoms may be mentioned. Specific examples thereof include terephthalic acid, isophthalic acid, phthalic acid, naphthalene-2,6-dicarboxylic acid, naphthalene-2,7-dicarboxylic acid, diphenyl-4,4-dicarboxylic acid, diphenoxyethanedicarboxylic acid and 5-sulfoisophthalic acid 5-sodium salt. Specific examples of the alicyclic dicarboxylic acid include 1,4-cyclohexane dicarboxylic acid, 1,2-cyclohexane dicarboxylic acid, and dicyclohexyl-4,4-dicarboxylic acid. Specific examples of the aliphatic dicarboxylic acid include succinic acid, oxalic acid, adipic acid, sebacic acid and dodecane dicarboxylic acid. These may be used singly or in a combination of two or more. Of them, terephthalic acid, isophthalic acid, 1,4-cyclohexane dicarboxylic acid, sebacic acid, adipic acid and dodecane dicarboxylic acid may be particularly preferably used in view of polymerizability, hue and physical properties.

As the diamine to be used as the third component, an aromatic, alicyclic and aliphatic diamine may be typically used. Specific examples of the aromatic diamine include p-phenylene diamine, m-phenylene diamine, diaminodiphenyl ether and diaminodiphenyl methane. Specific examples of the alicyclic diamine include piperazine, diaminodicyclohexylmethane, and cyclohexyl diamine. Specific examples of the aliphatic diamine include those having 2 to 12 carbon atoms such as hexamethylene diamine, ethylene diamine, propylene diamine and octamethylene diamine. These diamines may be used singly or in combination of two or more. Of these diamines, hexamethylene diamine is preferable.

Molecular weight of the soft segment (Y) is not particularly limited, however preferably 200 to 20,000, more preferably 300 to 10,000, and most preferably 300 to 4,000 in terms of number average molecular weight.

The ratio (X/Y) of the hard segment (X) to the soft segment (Y) in a polyamide elastomer as mentioned above is generally 10/90 to 95/5, preferably 20/80 to 90/10, more preferably 30/70 to 70/30, further more preferably 40/60 to 60/40, and most preferably 45/55 to 55/45 (% by mass). When the ratio of the hard segment is less than 10% by mass, compatibility with the thermoplastic resin (A) becomes poor, with the result that appearance of molded articles may degrade and impact resistance thereof may decrease. When the ratio exceeds 95% by mass, antistatic performance may decrease.

In consideration of antistatic performance and transparency, refractive index of the polyamide elastomer is preferably 1.500 to 1.530 and more preferably 1.510 to 1.520. When the refractive index is less than 1.500, antistatic performance and transparency decrease. When the refractive index exceeds 1.530, the compatibility with the thermoplastic resin (A) decreases, with the result that appearance of molded articles, impact resistance, and transparency may decrease.

Melting point of the polyamide elastomer is preferably 130 to 160° C., and more preferably, 140 to 150° C. In both cases where the melting point is less than 130° C. or beyond 160° C., the compatibility with the thermoplastic resin (A) degrades, with the result that impact resistance decreases and appearance of molded articles may degrade.

Solution viscosity of the polyamide elastomer (formic acid is used as a solvent) is preferably 1.35 to 1.70, more preferably 1.40 to 1.60, and most preferably 1.45 to 1.55. In both cases where the solution viscosity is less than 1.35 or beyond 1.70, the compatibility with the thermoplastic resin (A) degrades, with the result that impact resistance decreases and appearance of molded articles may degrade.

Surface resistivity value of the polyamide elastomer preferably falls within the range of $1 \times 10^8$ to $1 \times 10^{11} \Omega$. When it is outside the range, it may be difficult to obtain the surface resistivity value of the thermoplastic resin composition according to the present invention.

Methods of synthesizing the polyamide elastomer are not particularly limited; however, methods disclosed in Japanese Patent Publication No. S56-45419 and Japanese Patent. Laid-Open No. S55-133424 may be employed.

Alternatively, in accordance with the description of Japanese Patent No. 3386612, a polyamide elastomer prepared in the presence of a potassium compound before or during polymerization, or before separating and recovering the elastomer after polymerization may be used. In this case, antistatic properties of the thermoplastic resin composition according to the present invention can be improved without reducing impact resistance thereof. The amount of potassium compound to be used in a polyamide elastomer is 10 to 50,000 ppm, preferably 20 to 3,000 ppm, more preferably 50 to 1,000 ppm in terms of potassium atom. When the amount is less than 10 ppm, improvement of the antistatic properties may be insufficient. On the other hand, when the amount exceeds 50,000 ppm, surface appearance of molded articles may degrade.

The polyamide elastomer may contain a lithium compound such as lithium chloride and lithium bromide. In this case, surface resistance can be further reduced. In addition to or instead of the lithium compound, may be used at least one selected from an alkali metal such as sodium and potassium, an alkaline earth metal such as magnesium and calcium, organic acid salts, sulfonates, inorganic acid salts and halides thereof. Note that these metal compounds may be blended during or after polymerization of the polyamide elastomer or when the thermoplastic resin composition according to the present invention is produced.

As the polyester elastomer, mention may be made of a polyester elastomer produced by polycondensation between a dicarboxylic acid and a dihydroxy compound, polycondensation of an oxycarboxylic acid, ring-opening polycondensation of a lactone compound, and polycondensation of a mixture of these compounds. The polyester elastomer may be a homopolyester elastomer or a copolyester elastomer.

Examples of the dicarboxylic acid include terephthalic acid, isophthalic acid, naphthalene dicarboxylic acid, diphenyl dicarboxylic acid, diphenylether dicarboxylic acid, diphenylethane dicarboxylic acid, cyclohexane dicarboxylic acid, adipic acid, and sebacic acid, and alkyl-, alkoxy-, halogen-substituted compounds of these dicarboxylic acids. These dicarboxylic acids may be used in a form of a derivative that may form an ester, more specifically a lower alcohol ester such as dimethyl ester. These carboxylic acids may be used singly or in combination of two or more.

Examples of the dihydroxy compound include ethylene glycol, propylene glycol, butane diol, neopentyl glycol, butene diol, hydroquinone, resorcin, dihydroxydiphenyl ether, cyclohexane diol, hydroquinone, resorcin, dihydroxydiphenyl ether, cyclohexane diol, and 2,2-bis(4-hydroxyphenyl)propane, as well as polyoxyalkylene glycol and an alkyl, alkoxy or halogen substituted compounds thereof. These dihydroxy compounds may be used singly or in combination of two or more.

Examples of the oxycarboxylic acid include oxybenzoic acid, oxynaphthoic acid, diphenylene oxycarboxylic acid, and alkyl, alkoxy or halogen substituted compounds of these oxycarboxylic acids. These oxycarboxylic acids may be used singly or in combination of two or more.

The thermoplastic resin composition according to the present invention comprises at least the component (A) or the component (A) and the component (B) and, if necessary, may be blended with additives or the like. Examples of the additives include antioxidants, antistatistic agents and lubricants. Each of the components may be mixed together by melt-kneading or other methods by use of a kneading roller, a kneader, an extruder or the like.

The thermoplastic resin composition according to the present invention is formed into various molded articles by a general molding method such injection molding, sheet-extrusion, film-extrusion, vacuum molding, deformed molding and foam molding. Furthermore, the molded articles of the resin may be molded by dry-blending to obtain a molding material and continuously melt-kneading it. Alternatively, preparation of the molding material and the molding into molded articles may be performed as separate operations. Shape, dimension and usage of the molded articles are not particularly limited; but the molded articles are suitable for use in electronic materials and parts.

The thermoplastic resin composition and the molded article thus obtained generally contain volatile components such as unreacted monomers contained in the components (A) and (B). Outgas is caused by such volatile components. Therefore, it is preferable to perform treatment for vaporizing volatile components to surely reduce the amount of outgas to 1,500 μg/g or less in a production step of the thermoplastic resin composition of the present invention or in a molding step of a molded article. In order to reduce the amount of outgas contained in the entire composition, the following methods may be preferably employed in kneading or pelleting steps:

(1) The number of degassing stages is increased in an extruder or the like;
(2) The degree of vacuum is increased during degassing steps; and
(3) Degassing is azeotropically performed by adding water to the composition.

Also, the amount of outgas can be easily reduced by using, as the component (A) and/or the component (B), compounds low in content of low-molecular weight volatile components. As such a component (B), mention may be made of a polyamide elastomer comprising a hard segment formed of polyamide 12 and a soft segment formed of poly(alkylene oxide) glycol. As such a component (A), a styrenic resin low in acrylonitrile content may be mentioned.

In the present invention, the term "outgas" refers to the compounds which vaporize when a test sample obtained from a thermoplastic resin composition or a molded article is heated at 150° C. for 30 minutes. Examples of such compounds include unreacted monomers contained as impurities in molded articles or resin compositions, oligomers derived from monomers used therein, residual solvents and fatty acids derived from residual emulsifiers. The "outgas" is a term generally used in the technical field related to manufacture of semiconductors.

As the test sample, may be used a resin composition itself in the form of pellets or the like, a molded article into which the resin composition is formed as a test sample, a test sample cut out from the molded article and a test sample cut out from an article shaped into a product such as a container. In the present invention, it is important that the amount of outgas contained in a molded article is 1500 μg/g or less. The amount of outgas contained in a molded article formed from a thermoplastic resin composition of the present invention is generally considered equal to or less than that of the molding material, that is, the thermoplastic resin composition itself. Therefore, the thermoplastic resin composition having an outgas amount of 1500 μg/g or less is useful as a molding material for obtaining the molded article of the present invention. In either case of the thermoplastic resin composition and the molded article according to the present invention, the outgas amount is preferably 1000 μg/g, more preferably 900 μg/g or less, and most preferably 800 μg/g or less.

By use of the thermoplastic resin composition of the present invention reduced in outgas amount as a molding material, contamination of molding machines and molds can be prevented during molding process. In addition, it is possible to prevent discoloration of molded articles, deterioration of physical properties, deterioration of heat resistance and generation of residual odor. Furthermore, when the molded article is a container receiving semiconductor related components or the like, volatile matter, residual odor and the like generated from the container are reduced, and thus yield of semiconductor related components or the like received therein can be prevented from lowering.

In the present invention, the "outgas amount" is obtained by separating and quantifying outgas with gas chromatography/mass spectrometry analysis. More specifically, the "outgas amount" is the total amount of the outgas components (such as unreacted monomers, oligomers, residual solvents) which are quantified by mass spectrography after being separated and determined by a gas chromatography device in a retention time of 30 minutes. Gas chromatographic conditions employed herein are as follows:
(1) Type of column; BPX-5 (manufactured by SUPELCO)
(2) Length of column; 30 m
(3) Temperature of column; 200° C. (head space, purge and trap method)
(4) Type of carrier gas; Helium gas
(5) Flow rate of carrier gas; 50 ml/minute As to measuring apparatuses, for example, as a gas chromatography device, a MODEL "5890 SERIES II" manufactured by AGLIMENT may be used, and as a mass spectrography device, a MODEL "JEOL JMS AX505W" manufactured by JEOL DATUM may be used.

As the unreacted monomer constituting outgas, mention may be made of monomers which are used in production of a thermoplastic resin (A) and remain unreacted. When a styrenic resin is used as the thermoplastic resin (A), such monomers include, for example, aromatic vinyl monomers such as styrene, α-methylstyrene, σ-methylstyrene and p-methylstyrene, vinyl cyanide monomers such as acrylonitrile and methacrylonitrile, acrylic vinyl monomers such as methyl acrylate, ethyl acrylate, butyl acrylate and methyl methacrylate, and vinyl chloride. As the oligomer constituting outgas, mention may be made of dimers, trimers and the like of various monomers mentioned above. Furthermore, the residual solvent constituting outgas is the solvent which is used in production of a thermoplastic resin (A) and remains without being removed in degassing process. Examples of such a residual solvent include toluene, cyclohexane, pentane, butane, benzene, and ethyl chloride. As the fatty acid derived from an emulsifier and constituting the outgas, mention may be made of palmitic acid, oleic acid, stearic acid, linoleic acid and lauric acid.

The compounds determined in the gas chromatography/mass spectrography analysis in the retention time of 12 minutes mainly include unreacted monomers and residual solvents. The unreacted monomers and the residual solvents have low boiling points compared to oligomers, and thus can be relatively easily removed by degassing process and the like. The amounts of the compounds determined herein can be easily decreased by sufficiently treating them with degassing process. Therefore, it is desirable that the degassing process is performed sufficiently to reduce the vaporized amount of unreacted monomers to 800 ppm or less, preferably 600 ppm or less, and more preferably 400 ppm or less. The total amount of compounds measured in the retention time of 12 minutes is preferably 800 ppm or less, more preferably 700 ppm or less, and most preferably 600 ppm or less.

The compounds determined in the gas chromatography/mass spectrography analysis from the retention time of 12 minutes (not inclusive) to 20 minutes include oligomers and the like. In the retention time thereafter, compounds having a further higher boiling temperature, such as fatty acids, may be detected. The total amount of compounds separated and determined in the retention time of 20 minutes (by the time oligomers can be separated and detected) is preferably 1200 ppm or less, more preferably 1000 ppm or less, and most preferably 800 ppm or less. Furthermore, the total amount of compounds in a retention time of 30 minutes (by the time fatty acids and the like are separated and detected), that is, the amount of outgas, is as described above.

The thermoplastic resin composition according to the present invention and the molded article thereof each have a surface resistivity of $1\times10^{11}\Omega$ or less, preferably $1\times10^{10}\Omega$ or less, more preferably $1\times10^{4}$ to $1\times10^{10}\Omega$, and most preferably $1\times10^{4}$ to $1\times10^{9}\Omega$. When a surface resistivity falls within this range, attachment of particles or the like can be sufficiently prevented. In the case where semiconductor related components and the like are transferred and processed in a clean room, and therefore, attachment of particles or the like may not raise a significant problem, the surface resistivity is preferably $1\times10^{8}$ to $1\times10^{11}\Omega$, and particularly preferably $1\times10^{8}$ to $1\times10^9 \Omega$. On the other hand, when sufficient antistatic properties are particularly required, the surface resistivity is preferably $1\times10^4$ to $1\times10^9 \Omega$.

In the case where the resinous molded article is a container for receiving at least one of a semiconductor related component, a semiconductor related device, a liquid crystal related component and a liquid crystal related device, a plurality of containers are often stacked with each other; a lid is opened and closed when the container has the lid; and the container is moved on the upper surface of a workbench formed of stainless steel or the like during operation. When these are repeated, abrasion powder is generated from the container, thereby degrading performance of products received therein. For this reason, a resinous molded article preferably has a sufficient abrasion resistance, and more specifically, has an abrasion amount of preferably 3.0 mg or less as measured by a reciprocating friction and wear tester on the conditions of 2 kg load, 20 mm/second in moving speed of test piece, and 200 times of reciprocal motion using, as a counterpart, a sheet formed of the same resin as used in the resinous molded article. Note that the sheet used as the counterpart may be a flat plate. The abrasion amount is preferably 2.5 mg or less, particularly 2.0 mg or less, and more preferably 1.5 mg or less. If the abrasion amount of a resinous molded article is 3.0 mg or less, it can be a resinous molded article which is excellent in abrasion resistance and produces a less amount of abrasion powder.

The resinous molded article preferably has a predetermined dynamic friction coefficient which is preferably 3.0 or less. The dynamic friction coefficient is more preferably 2.0 or less, particularly 1.0 or less, and most preferably 0.6 or less. When the dynamic friction coefficient of a resinous molded article is 3.0 or less, the resinous molded article can smoothly slide and easily move on the upper surface of a workbench even when stacked with each other, with the result that the abrasion amount can be reduced.

Also in the case where the counterpart is a stainless-steel board, the abrasion amount is preferably 3.0 mg or less and a dynamic friction coefficient is preferably 3.0 or less.

The resinous molded article has a predetermined taber abrasion index which is preferably less than 30.

The thermoplastic resin composition according to the present invention is suitable as a molding material for a container or the like that receives at least one of a curtain, partition, and wall material for a clean room, a semiconductor related component, a semiconductor related device, a liquid crystal related component and a liquid crystal related device, whose outgas amount must be reduced, and particularly suitable as a molding material for a container that receives at least one of a semiconductor related component and a semiconductor related device. Examples of the semiconductor related component include a semiconductor wafer such as a silicon wafer, a hard disk, a recording disk such as a magnet-optical disk, a disk substrate, an IC chip, a display substrate such as a glass substrate for LCD and an organic EL glass substrate, a LCD color filer and a magnetic resistance head of a hard disk. The semiconductor related device includes, for example, a mask for an original picture used in lithography. The container mentioned above may be an open container without a lid or may consist of an openable or sealable lid and a container main body. Shape, dimension and usage of the resinous molded article are not particularly limited. The container main body or lid may be provided with a reinforcement rib and a partition rib.

As this kind of containers, mention may be made of a wafer box for housing a semiconductor wafer such as a silicon wafer and a mask box for storing a mask for an original picture used in lithography, which are equipped with a lid and sealable. In addition, mention is made of a container which is composed only of a main body without a lid such as a semiconductor tray on which a semiconductor chip is placed. Note that a carrier or the like is often housed or placed in these containers for immobilizing and holding a semiconductor wafer and a semiconductor chip. It should be understood that the carrier and the like form part of the container. The container which is equipped with a lid and sealable is used for transferring a semiconductor wafer and a mask for an original picture sealingly housed therein between factories, buildings within a factory, and manufacturing steps. The sealable container can be used in transferring them within a clean room. On the other hand, the container which is composed only of a main body without a lid is particularly used in transferring a semiconductor chip within a well-equipped clean room and in processing a chip within the container.

EXAMPLES

The present invention will be explained in details below by way of Examples. Unless otherwise specified, the terms "part(s)" and "%" are based on mass. Each of the physical properties shown in the Examples was measured as described in Section (1).

(1) Measurement of Physical Properties (1-1) Measurement of Outgas Amount

A sheet of 80×55×2.4 mm was formed by compression molding at 210° C. Test sample piece of 50 mg by mass was cut out from the sheet and charged in a heat extraction tube. Then, 10 mg of quartz wool treated with silane was each charged in the tube at each side of the test piece. The heat extraction tube was housed in a heat furnace to which helium gas was then supplied at a rate of 50 ml/minute at room temperature (25° C.) for one minute. Subsequently, the temperature of the furnace was increased at a rate of 60° C./minute, and maintained to be heated at 150° C. for 30 minutes. In this manner, outgas generated from the test sample piece and captured was injected into a gas chromatography device (manufactured by AGLIMENT, the MODEL "5890 SERIES II") through an injection port. The outgas separated was quantified by mass spectrography device (manufactured by JEOL DATUM, the MODEL "JEOL JMS AX505W"). Note that the outgas amount shown in Table 1 is the total amount of gases obtained in the retention time of 30 minutes.

(1-2) Measurement of Surface Resistivity

A disk-shaped resinous molded article of 100 mm diameter and 2 mm thickness was produced and conditioned at a temperature of 23° C. and a relative humidity of 50% for 7 days. Thereafter, the surface resistivity of the molded article was measured by an ultra-insulation resistance meter (manufactured by YOKOKAWA HEWLETT-PACKARD, a MODEL "4329A").

(1-3) Measurement of Abrasion Resistance (1)

A test piece of 80×50×2.4 mm was formed by injection molding. The test piece was cut into pieces of 25×25 mm and adhered to four corners of the bottom of a wafer case for an 8 inch wafer with two-sided adhesion tapes. A weight was placed in the case such that the entire weight of the case became 4 kg. Subsequently, the case was placed on a product shelf (formed of stainless steel rods of ϕ3.8 mm) and a glass plate was disposed immediately below the case at a distance of 20 cm. After the case was repeatedly loaded and unloaded 10 times, the particles of the abrasion powder dropped on the glass plate was visually counted. The number of abrasion powder particles was regarded as an abrasion amount.

(1-4) Measurement of Abrasion Resistance (2)

Abrasion resistance was determined by using a reciprocating dynamic friction abrader, a machine of MODEL "AFT-15M" manufactured by TOSOKU SEIMITSU KOGYOU in the manner mentioned above. As test pieces, a sliding ring and a flat plate of 80×55×2.4 were used in accordance with JIS K7218 A. Measurement was performed by reciprocally moving the flat plate.

(1-5) Measurement of Dynamic Friction Coefficient

A dynamic friction coefficient was measured at the same time when the abrasion amount was measured in accordance with the above item (1-4).

(1-6) Measurement of Transparency

A test piece of 80×55×2.4 mm was formed by injection molding. After the test piece was conditioned at 23° C. and 50% RH for 2 days, haze of the test piece was measured by HAZE-GARD PLUS manufactured by GARDNER. The test piece was further conditioned at 80° C. and 50% RH for a day, and then haze thereof was measured.

(1-7) Charpy Impact Strength

Charpy impact strength was evaluated in accordance with ISO 179.

(1-8) Taber Abrasion Index

Taber abrasion was measured in accordance with JIS K7204 under the conditions: an abrasion ring CS17, a load of 1000 g, and rotation times of 1000. A taber abrasion index was obtained in accordance with the following equation:

Taber abrasion index=(1000/rotation)×abrasion amount (mg)

(2) Production of Rubber-reinforced Resin (A1)
(2-1) Production of Rubber-reinforced Resin (A1-1)

To a glass flask having an internal volume of 7 L and equipped with a stirrer, ion exchanged water (100 parts), potassium rosinate (1 part), t-dodecyl mercaptan (0.5 part), butadiene rubber latex (40 parts in terms of solid matter), styrene (45 parts) and acrylonitrile (15 parts) were placed. The temperature of the mixture was increased while stirring. When the temperature reached 50° C., an aqueous activating solution containing sodium ethylenediamine tetraacetate (0.2 part), ferrous sulfate (0.01 part), sodium formaldehyde sulfoxylate 2 hydrates (0.2 part) and ion exchanged water (10 parts) and diisopropylbenzene hydroperoxide (0.2 part) were added to the reaction mixture and allowed to react for 6 hours. Conversion of monomers to polymers was 96%. Thereafter, the reaction product, namely latex, was coagulated with an aqueous 0.5% sulfuric acid solution at 40° C. The temperature of the resultant slurry was increased to 90° C. and maintained for 5 minutes. Subsequently, the slurry was washed with water and dewatered. Then, the slurry was dried at 75° C. for 24 hours to obtain a rubber-reinforced resin (A1-1) as powder.

(2-2) Production of Rubber-reinforced Resin (A1-2)

To a glass flask having an internal volume of 7 L and equipped with a stirrer, ion exchanged water (100 parts), potassium rosinate (2 parts), t-dodecyl mercaptan (0.5 part), butadiene rubber latex (30 parts in terms of solid matter), styrene (16 parts), acrylonitrile (5 parts) and methyl methacrylate (49 parts) were placed. The temperature of the mixture was increased while stirring. When the temperature reached 50° C., an aqueous activating solution containing sodium ethylenediamine tetraacetate (0.2 part), ferrous sulfate (0.05 part), sodium formaldehyde sulfoxylate 2 hydrates (0.2 part) and ion exchanged water (10 parts) and diisopropylbenzene hydroperoxide (0.2 part) were added to the reaction mixture and allowed to react for 6 hours. Conversion of monomers to polymers was 96%. Thereafter, a reaction product, namely latex, was coagulated with an aqueous 0.5% sulfuric acid solution at 40° C. The temperature of the resultant slurry was increased to 90° C. and maintained for 5 minutes. Subsequently, the slurry was washed with water and dewatered. Then, the slurry was dried at 75° C. for 24 hours to obtain a rubber-reinforced resin (A1-2) as powder.

(2-3) Production of Rubber-reinforced Resin (A1-3)

To a stainless steel autoclave of 20 L volume equipped with a ribbon-form mixing blade, an auxiliary agent continuous feeder and a thermometer, ethylene/propylene rubber (30 parts), styrene (45 parts), acrylonitrile (25 parts) and toluene (110 parts) were placed. The internal temperature was increased to 75° C. The content of the autoclave was stirred for one hour to obtain a homogenous solution. Thereafter, t-butyl-peroxyisopropyl carbonate (0.45 part) was added to the mixture and the internal temperature was further increased to 100° C. While maintaining the temperature, the reaction was performed at a mixing blade rotation speed of 100 rpm. Four hours after initiation of the reaction, the internal temperature was further increased to 120° C. While maintaining the temperature, the reaction was allowed to perform for a further 2 hours. Conversion monomers to polymers was 85%. Then, the internal temperature was reduced to 100° C. Thereafter, octadecyl-3-(3,5-di-t-butyl-4-hydroxyphenol)-propionate (0.2 part) was added. Subsequently, the reaction mixture was taken out from the autoclave and subjected to vaporization with water vapor to remove unreacted matters and solvents. The resultant product was formed into pellets by an extruder of 40 mm in cylinder diameter equipped with a vent to obtain a rubber-reinforced resin (A1-3).

(2-4) Production of Rubber Reinforced Resin (A1-4)

A rubber reinforced resin (A1-4) was obtained in the same manner as the rubber-reinforced resin (A1-1), except that the composition formulation shown in Table 1 was used.

(3) Production of Copolymer (A2)
(3-1) Production of Copolymer (A2-1)

Two polymerization reactors each of which had an internal volume of 7 L and was equipped with a ribbon blade and a jacket were connected and purged with nitrogen. To the first polymerization reactor, styrene (75 parts), acrylonitrile (25 parts) and toluene (20 parts) were successively supplied. Subsequently, a solution of t-dodecyl mercaptan (0.1 part) serving as a molecular weight adjusting agent in toluene (5 parts) and a solution of 1,1'-azobis(cyclohexane-1-carbonitrile) (0.1 part) serving as a polymerization initiator in toluene (5 parts) were successively supplied. Polymerization was performed while controlling the temperature of the first polymerization reactor at 110° C. and an average retention time to 2 hours. Conversion to polymers was 60%. Thereafter, by use of a pump arranged outside the first polymerization reactor, the resultant polymer solution was continuously taken out of the first polymerization reactor and supplied to the second polymerization reactor in the same amount as the total amount of the above supplied styrene, acrylonitrile, toluene, molecular weight adjusting agent and polymerization initiator. Polymerization was performed in the second polymerization reactor at a polymerization temperature of 130° C. for an average retention time of 2 hours. Conversion to polymers was 80%. Then, the polymer solution was taken out of the second polymerization reactor and directly supplied to a double-screw extruder with triple vents so as to remove unreacted monomers and solvents to obtain a copolymer (A2-1). Limiting viscosity [η] of acetone-soluble matter of the copolymer (A2-1) was 0.48 dl/g.

(3-2) Production of Copolymer (A2-2)

Two polymerization reactors each of which had an internal volume of 30 L and was equipped with a ribbon blade and a jacket were connected and purged with nitrogen. To the first polymerization reactor, styrene (21 parts), acrylonitrile (7 parts), methyl methacrylate (72 parts) and toluene (20 parts) were successively supplied. Subsequently, a solution of t-dodecyl mercaptan (0.1 part) serving as a molecular weight adjusting agent in toluene (5 parts) and a solution of 1,1'-azobis(cyclohexane-1-carbonitrile) (0.1 part) serving as a polymerization initiator in toluene (5 parts) were successively supplied. Polymerization was performed while controlling the temperature of the first polymerization reactor at 110° C. and an average retention time to 2 hours. Conversion to polymers was 60%. Thereafter, by use of a pump arranged outside the first polymerization reactor, the resultant polymer solution was continuously taken out of the first polymerization reactor and supplied to the second polymerization reactor in the same amount as the total amount of the above supplied styrene, acrylonitrile, methyl methacrylate, toluene, molecular weight adjusting agent and polymerization initiator. Polymerization was performed in the second polymerization reactor at a polymerization temperature of 130° C. for an average retention time of 2 hours. Conversion to polymers was 80%. Then, the polymer solution was taken out of the second polymerization reactor and directly supplied to a double-screw extruder with triple vents so as to remove unreacted monomers and solvents to obtain a copolymer (A2-2). Limiting viscosity [η] of acetone-soluble matter of the copolymer (A2-2) was 0.25 dl/g.

(3-3) Production of a Copolymer (A2-3)

To a glass flask having an internal volume of 7 L and equipped with a stirrer, ion exchanged water (100 parts), sodium dodecylbenzene sulfonate (2.5 parts), t-dodecyl mercaptan (0.1 part), styrene (22.5 parts), acrylonitrile (7.5 parts) and hydroxyethyl methacrylate (3.3 parts) were placed. The temperature of the flask was increased while stirring. When the temperature reached 50° C., an aqueous solution containing potassium persulfate (0.1 part) and ion exchanged water (5 parts) was added to the flask and a reaction was performed for 2 hours. Thereafter, an aqueous solution containing styrene (22.5 parts), acrylonitrile (7.5 parts), hydroxyethyl methacrylate (3.3 parts), potassium persulfate (0.1 part) and ion exchange water (5 parts) was added thereto and a reaction was performed for 2 hours.

Further, an aqueous solution containing styrene (22.5 parts), acrylonitrile (7.5 parts), hydroxyethyl methacrylate (3.4 parts), potassium persulfate (0.1 part) and ion exchange water (5 parts) was added thereto and a reaction was performed for 3 hours.

Conversion of monomers to polymers was 98%. Thereafter, a reaction product, namely latex, was coagulated with a 10% aqueous solution of calcium chloride at 40° C. The temperature of the resultant slurry was increased to 90° C. and maintained for 5 minutes. Then, the slurry was washed with water, dewatered and dried at 75° C. for 24 hours to obtain a polymer (A2-3) as powder.

The mass ratio of the rubber-like polymers and vinyl monomers used in production of the rubber-reinforced resins (A1-1) to (A1-4) and the copolymers (A2-1) to (A2-3) are shown in Table 1.

TABLE 1

|  | A1-1 | A1-2 | A1-3 | A1-4 | A2-1 | A2-2 | A2-3 |
|---|---|---|---|---|---|---|---|
| Emulsion-polymerized polybutadiene | 40 | 30 | — | 18 | — | — | — |
| Ethylene/propylene rubber | — | — | 30 | — | — | — | — |

TABLE 1-continued

|  | A1-1 | A1-2 | A1-3 | A1-4 | A2-1 | A2-2 | A2-3 |
|---|---|---|---|---|---|---|---|
| Styrene | 45 | 16 | 45 | 20 | 75 | 21 | 67.5 |
| Acrylonitrile | 15 | 5 | 25 | — | 25 | 7 | 22.5 |
| Methyl methacrylate | — | 49 | — | 62 | — | 72 | — |
| Hydroxyethyl methacrylate | — | — | — | — | — | — | 10 |

(4) Polyamide Elastomer (Component (B))

A polyamide elastomer (PA12 polyamide elastomer) made of a hard segment of polyamide 12 and a soft segment of poly(alkylene oxide)glycol was used, which had a refraction index of 1.514, a melting point of 148° C., a solution viscosity of 1.51, and a surface resistivity value of $31 \times 10^{10} \Omega$.

A polyamide elastomer (PA6 polyamide elastomer) made of a hard segment of a polyamide 6 and a soft segment of poly(alkylene oxide)glycol was used, which had a refraction index of 1.514, a melting point of 195° C., a solution viscosity of 1.51, and a surface resistivity value of $4 \times 10^{10} \Omega$.

(5) Examples I-1 to I-8 and Comparative Examples I-1 to I-7 (Preparation and Evaluation of Molding Materials)

In Examples I-1 to I-8, the rubber-reinforced resins (A1-1) to (A1-3), the copolymers (A2-1) to (A2-2), and the polyamide elastomers (Examples I-4 to I-6 and I-8 and Comparative Examples I-4 to I-6) or a conductive carbon (Example I-7 and Comparative Example I-7) serving as surface resistivity reducing substances were dry-blended by a corn blender in accordance with the mass ratios shown in Table 2. Thereafter, each of the mixtures was kneaded to obtain pellets in an extruder having a cylinder of 40 mm diameter and equipped with triple vents with addition of water (1 part) by a double Dulmage screw at a cylinder temperature of 220° C. while degassing was performed under the degree of vacuum shown in Table 2. On the other hand, in Comparative Examples I-1 to I-7, the raw materials were dry-blended by a corn blender in accordance with the mass ratios shown in Table 3. Thereafter, each of the mixtures was kneaded to obtain pellets in an extruder having a cylinder of 40 mm diameter and equipped with a single vent with or without addition of water (1 part) by a screw having no Dulmage portion at a cylinder temperature of 220° C. while degassing was performed under the degree of vacuum shown in Table 3.

Examples I-1, I-4 and I-7 and Comparative Examples I-1, I-4 and I-7 relate to ABS resins. Examples I-2 and I-5 and Comparative Examples I-2 and I-5 relate to transparent ABS resins. Examples I-3 and I-6 and Comparative Examples I-3 and I-6 relate to AES resins. Example I-8 relates to a styrenic resin which was not rubber-reinforced. Resin pellets obtained in these Examples and Comparative Examples were analyzed for the physical properties mentioned above. The results are shown in Tables 2 and 3.

TABLE 2

| Example | | | I-1 | I-2 | I-3 | I-4 | I-5 | I-6 | I-7 | I-8 |
|---|---|---|---|---|---|---|---|---|---|---|
| Formulation (parts) | Component A | A1-1 | 40 | — | — | 32 | — | — | 35 | — |
| | | A1-2 | — | 40 | — | — | 32 | — | — | — |
| | | A1-3 | — | — | 40 | — | — | 32 | — | — |
| | | A1-4 | — | — | — | — | — | — | — | — |
| | | A2-1 | 60 | — | 60 | 48 | — | 48 | 55 | — |
| | | A2-2 | — | 60 | — | — | 48 | — | — | 80 |
| | | A2-3 | — | — | — | — | — | — | — | — |
| | Component B | PA12 polyamide elastomer | — | — | — | 20 | 20 | 20 | — | 20 |
| | | PA6 polyamide elastomer | — | — | — | — | — | — | — | — |
| | | Conductive carbon | — | — | — | — | — | — | 10 | — |
| | | Content (parts) relative to Component A (100 parts) | 0 | 0 | 0 | 25 | 25 | 25 | 11.1 | 25 |
| Process condition | Degassing method | | TV&DD | TV&DD | TV&DD | TV&DD | TV&DD | TV&DD | TV&DD | TV&DD |
| | Degree of vacuum (kPa) | | 80 | 95 | 95 | 95 | 95 | 95 | 95 | 95 |
| | Addition of water (addition amount: 1 part) | | Added | Added | Added | Added | Added | Added | Added | Added |
| Property | Outgas amount (µg/g) | | 980 | 1050 | 950 | 800 | 650 | 950 | 830 | 780 |
| | Surface resistivity (Ω) | | — | — | — | $5 \times 10^9$ | $6 \times 10^9$ | $6 \times 10^9$ | $5 \times 10^8$ | $5 \times 10^9$ |
| | Abrasion resistance (2) (mg) | | 0.2 | 0.2 | 0.1 | 0.4 | 0.4 | 0.1 | 0.5 | 0.4 |
| | Dynamic friction coefficient | | 0.60 | 0.57 | 0.54 | 0.67 | 0.60 | 0.51 | 0.81 | 0.75 |
| | Haze (%) t-2.4 mm ordinary temperature | | — | 5 | — | — | 12 | — | — | — |
| | Taber abrasion index | | 29 | 28 | 29 | 19 | 18 | 20 | 31 | 19 |

In the Table, TV denotes triple vents, and DD denotes double Dulmage.

TABLE 3

| Comparative Example | | | I-1 | I-2 | I-3 | I-4 | I-5 | I-6 | I-7 |
|---|---|---|---|---|---|---|---|---|---|
| Formulation (parts) | Component A | A1-1 | 40 | — | — | 32 | — | — | 35 |
| | | A1-2 | — | 40 | — | — | 32 | — | — |
| | | A1-3 | — | — | 40 | — | — | 32 | — |
| | | A1-4 | — | — | — | — | — | — | — |
| | | A2-1 | 60 | — | 60 | 48 | — | 48 | 55 |
| | | A2-2 | — | 60 | — | — | 48 | — | — |
| | | A2-3 | — | — | — | — | — | — | — |
| | Component B | PA12 polyamide elastomer | — | — | — | 20 | 20 | 20 | — |
| | | PA6 polyamide elastomer | — | — | — | — | — | — | — |
| | | Conductive carbon | — | — | — | — | — | — | 10 |
| | | Content (parts) relative to Component A (100 parts) | 0 | 0 | 0 | 25 | 25 | 25 | 11.1 |
| Process condition | Degassing method | | SV | SV | SV | SV | SV | SV | SV |
| | Degree of vacuum (kPa) | | 0 | 0 | 80 | 80 | 80 | 80 | 80 |
| | Addition of water (addition amount: 1 part) | | Not added | Not added | Not added | Not added | Added | Added | Added |
| Property | Outgas amount (µg/g) | | 3800 | 3650 | 3050 | 2850 | 2500 | 2650 | 2600 |
| | Surface resistivity (Ω) | | — | — | — | $8 \times 10^9$ | $9 \times 10^9$ | $9 \times 10^9$ | $8 \times 10^6$ |
| | Abrasion resistance (2) (mg) | | 3.2 | 2.8 | 0.3 | 0.8 | 0.9 | 0.4 | 3.1 |
| | Dynamic friction coefficient | | 3.1 | 2.5 | 0.85 | 1.2 | 1.5 | 0.95 | 3.5 |
| | Haze (%) t-2.4 mm ordinary temperature | | — | 9 | — | — | 17 | — | — |
| | Taber abrasion index | | 28 | 28 | 29 | 19 | 20 | 18 | 30 |

In the Table, SV denotes a single vent.

According to Table 2, in Examples I-1 to I-8, the outgas amounts were 1050 ppm or less, abrasion amounts were as low as 0.5 mg or less, dynamic friction coefficients were 0.81 or less and taber abrasion indexes were 31 or less. From these, it is demonstrated that the products are useful as containers for semiconductor related components and the like. In addition, since a surface resistivity reducing substance was added, the surface resistivities were as low as $6 \times 10^9$ or less. It is demonstrated that the products also have excellent antistaticity. On the other hand, according to Table 3, in Comparative Examples I-1 to I-7, the outgas amounts were 2500 ppm or more, which mean that a large amount of impurities are contained. The abrasion amount, dynamic friction coefficient and taber abrasion index were not extremely low but insufficient compared to the Examples. Even if a surface resistivity reducing substance was added thereto in the same amount as in the Examples, the surface resistivity was slightly high.

(6) Manufacture of Wafer Boxes and Wafer Trays and Evaluation Thereof

Figure 1:
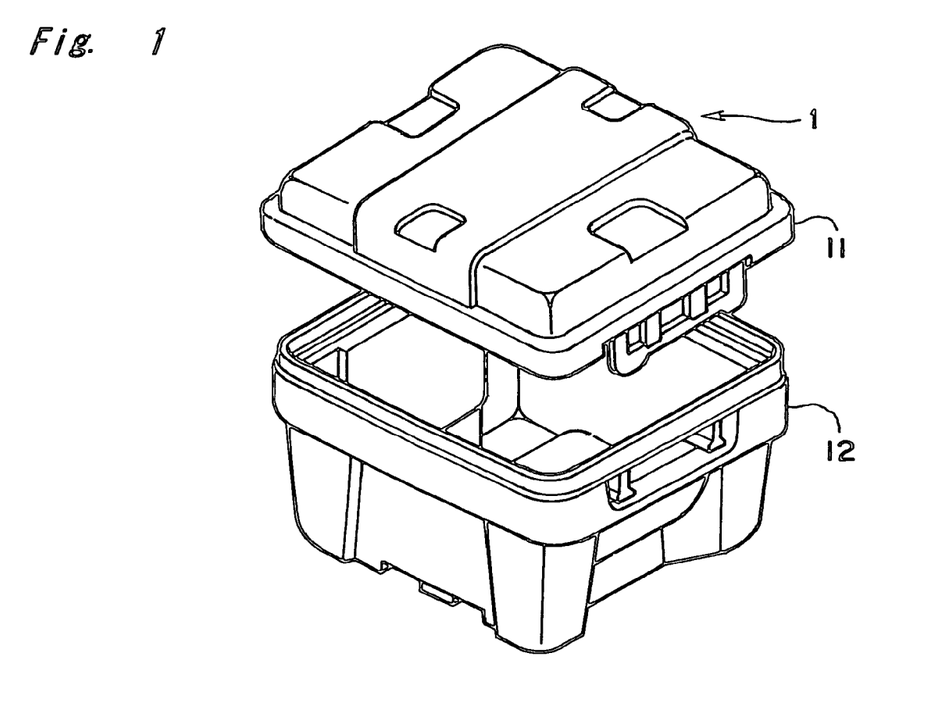
FIG. 1 is a perspective view showing appearance of a wafer box which is a specific example of a resinous molded article.
Figure 2:
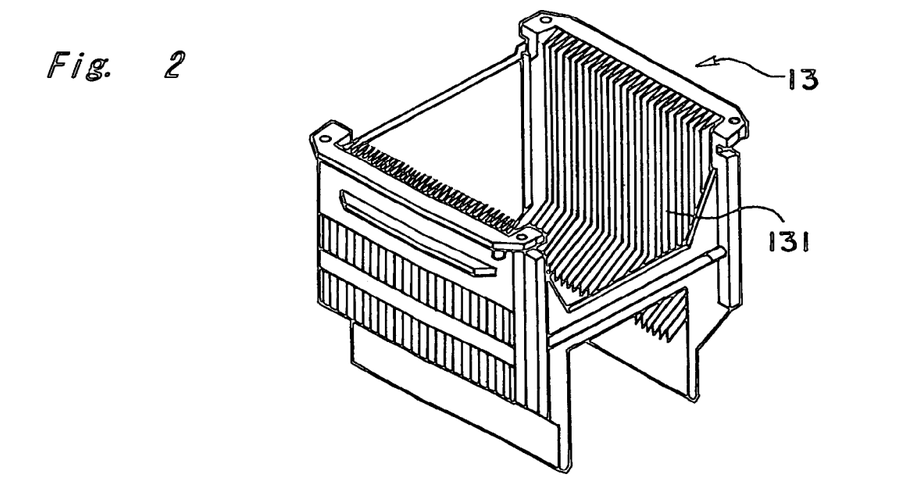
FIG. 2 is a perspective view showing a wafer tray to be housed in the wafer box of FIG. 1.

A wafer box 1 shown in FIG. 1 and a wafer tray 13 shown in FIG. 2 were prepared using each of the ABS resins obtained in Example I-1 and Comparative Example I-1 by an injection-molding machine at a mold temperature of 50° C. The wafer box 1 can house 25 sheets of wafer of 8-inch diameter. Furthermore, the wafer box 1 houses the wafer tray 13 shown in FIG. 2. The wafer tray is provided on the inner surface of the lateral walls with an opposed pair of 26 ribs 131 protruding from the wall, so that semiconductor wafers can be immobilized by the ribs.

Twenty-five (25) sheets of 8-inch silicon wafer were housed in each of the wafer trays that were prepared from the ABS resins of Examples I-1 and Comparative Example I-1 respectively. The wafer trays were housed in the respective wafer boxes, which were covered airtight with lids. The wafer boxes were allowed to stand still at 85° C. for 25 hours. Thereafter, a circuit was printed on each of the silicon wafers to prepare chips, which were evaluated for function. As a result, all chips formed of the silicon wafers housed in the wafer box formed of the ABS resin according to Example I-1 showed no malfunction. On the other hand, chips formed of the silicon wafers housed in the wafer box formed of the ABS resin according to Comparative Example I-1 showed malfunction.

(7) Examples II-1 to II-12 and Comparative Example II-1 to II-6 (Preparation of Molding Materials and Evaluation Thereof)

In Examples II-1 to II-10, the rubber reinforced resins (A1-1) to (A1-3), the copolymers (A2-1) to (A2-3) and the polyamide elastomers (Example II-1 to II-10) serving as surface resistivity reducing substances were dry-blended by a corn blender in accordance with the formulations shown in Table 4. Thereafter, each of the mixtures was kneaded to obtain pellets in an extruder having a cylinder of 40 mm diameter and equipped with triple vents by a double Dulmage screw at a cylinder temperature of 220° C. under the processing, conditions shown in Table 4 (degassing method, degree of vacuum, and addition of water (1 part)). In Examples II-11 to 11-12, pellets were obtained in the same manner as above except that the rubber-reinforced resin (A1-4) was employed together with a polyamide elastomer that serves as a surface resistivity reducing substance.

In Comparative Examples II-1 to II-6, the rubber reinforced resins (A1-1) to (A1-3), the copolymers (A2-1) to (A2-3) and the polyamide elastomers (Comparative Examples II-2 to II-6) serving as surface resistivity reducing substances were dry-blended by a cone blender in accordance with the formulations shown in Table 5. Thereafter, each of the mixtures was kneaded to obtain pellets under the processing conditions shown in Table 5 (degassing method, degree of vacuum, and addition of water (1 part)).

The obtained pellets were evaluated for the physical properties. The results are shown in Tables 4 and 5.

TABLE 4

| | Example | | II-1 | II-2 | II-3 | II-4 | II-5 | II-6 |
|---|---|---|---|---|---|---|---|---|
| Formulation (parts) | Component A | A1-1 | 40 | 40 | — | — | — | — |
| | | A1-2 | — | — | 40 | 40 | 35 | 35 |
| | | A1-3 | — | — | — | — | — | — |
| | | A1-4 | — | — | — | — | — | — |
| | | A2-1 | 40 | 35 | — | — | — | — |
| | | A2-2 | — | — | 40 | 35 | 53 | 35 |
| | | A2-3 | — | 5 | — | 5 | — | 5 |
| | Component B | PA12 polyamide elastomer | 20 | 20 | 20 | 20 | 12 | 25 |
| | | PA6 polyamide elastomer | — | — | — | — | — | — |
| | | Content (parts) relative to Component A (100 parts) | 25 | 25 | 25 | 25 | 13.6 | 33.3 |
| Process condition | Degassing method | | TV&DD | TV&DD | TV&DD | TV&DD | TV&DD | TV&DD |
| | Degree of vacuum (kPa) | | 80 | 95 | 95 | 95 | 95 | 90 |
| | Addition of water (addition amount: 1 part) | | Added | Added | Added | Added | Added | Added |
| Property | Outgas amount (μg/g) | | 850 | 750 | 650 | 700 | 700 | 800 |
| | Surface resistivity (Ω) | | $5.0 \times 10^{10}$ | $6.0 \times 10^{9}$ | $7.0 \times 10^{9}$ | $1.0 \times 10^{10}$ | $8.0 \times 10^{10}$ | $5.0 \times 10^{9}$ |
| | Abrasion resistance (1) (number of particles) | | 0 | 1 | 0 | 0 | 1 | 0 |
| | Haze (%) t = 2.4 mm ordinary temperature | | — | — | 6 | 9 | 7 | 10 |
| | Haze (%) t-2.4 mm after conditioned at 80° C. | | — | — | 6 | 10 | 7 | 11 |
| | Charpy impact strength (kJ/m$^2$) | | 20 | 18 | 22 | 20 | 22 | 19 |
| | Taber abrasion index | | 18 | 16 | 18 | 19 | 20 | 18 |

| | Example | | II-7 | II-8 | II-9 | II-10 | II-11 | II-12 |
|---|---|---|---|---|---|---|---|---|
| Formulation (parts) | Component A | A1-1 | — | — | — | — | — | — |
| | | A1-2 | — | — | — | 40 | — | — |
| | | A1-3 | 35 | 35 | — | — | — | — |
| | | A1-4 | — | — | — | — | 80 | 80 |
| | | A2-1 | — | — | — | 35 | — | — |
| | | A2-2 | 45 | 40 | 80 | — | — | — |
| | | A2-3 | — | 5 | — | — | — | — |
| | Component B | PA12 polyamide elastomer | 20 | 20 | 20 | 25 | 20 | — |
| | | PA6 polyamide elastomer | — | — | — | — | — | 20 |
| | | Content (parts) | 25 | 25 | 25 | 33.3 | 25 | 25 |

TABLE 4-continued

|  |  | | | | | | |
|---|---|---|---|---|---|---|---|
| | relative to Component A (100 parts) | | | | | | |
| Process condition | Degassing method | TV&DD | TV&DD | TV&DD | TV&DD | TV&DD | TV&DD |
| | Degree of vacuum (kPa) | 95 | 95 | 95 | 95 | 95 | 95 |
| | Addition of water (addition amount: 1 part) | Added | Added | Added | Added | Added | Added |
| Property | Outgas amount (μg/g) | 650 | 720 | 610 | 700 | 500 | 1350 |
| | Surface resistivity (Ω) | $1.0 \times 10^{10}$ | $8.0 \times 10^{9}$ | $7.5 \times 10^{9}$ | $6.0 \times 10^{8}$ | $7.0 \times 10^{9}$ | $8.0 \times 10^{9}$ |
| | Abrasion resistance (1) (number of particles) | 0 | 0 | 2 | 0 | 0 | 0 |
| | Haze (%) t = 2.4 mm ordinary temperature | 12 | 15 | 9 | 11 | 11 | 10 |
| | Haze (%) t-2.4 mm after conditioned at 80° C. | 12 | 15 | 10 | 13 | 13 | 12 |
| | Charpy impact strength (kJ/m²) | 20 | 20 | 5 | 21 | 20 | 18 |
| | Taber abrasion index | 17 | 16 | 16 | 17 | 16 | 18 |

In the Table, TV denotes triple vents, and DD denotes double Dulmage.

TABLE 5

| | Comparative Example | | II-1 | II-2 | II-3 | II-4 | II-5 | II-6 |
|---|---|---|---|---|---|---|---|---|
| Formulation (parts) | Component A | A1-1 | 40 | — | — | — | — | — |
| | | A1-2 | — | 30 | 40 | — | — | — |
| | | A1-3 | — | — | — | 35 | 35 | — |
| | | A1-4 | — | — | — | — | — | — |
| | | A2-1 | 60 | — | — | — | — | — |
| | | A2-2 | — | 25 | 40 | 45 | 40 | 80 |
| | | A2-3 | — | — | — | — | 5 | — |
| | Component B | PA12 polyamide elastomer | — | 45 | — | — | — | — |
| | | PA6 polyamide elastomer | — | — | 20 | 20 | 20 | 20 |
| | | Content (parts) relative to Component A (100 parts) | 0 | 81.8 | 25 | 25 | 25 | 25 |
| Process condition | Degassing method | | SV | TV&DD | SV | SV | SV | SV |
| | Degree of vacuum (kPa) | | 80 | 95 | 90 | 95 | 95 | 90 |
| | Addition of water (addition amount: 1 part) | | Added | Added | Added | Added | Added | Added |
| Property | Outgas amount (μg/g) | | 2400 | 2500 | 3800 | 2750 | 1800 | 1750 |
| | Surface resistivity (Ω) | | $10^{13}$ or more | $3.0 \times 10^{9}$ | $8.0 \times 10^{9}$ | $1.1 \times 10^{10}$ | $8.3 \times 10^{10}$ | $8.0 \times 10^{9}$ |
| | Abrasion resistance (1) (number of particles) | | 75 | 100 | 10 | 5 | 20 | 20 |
| | Haze (%) t = 2.4 mm ordinary temperature | | — | 20 | 10 | 13 | 15 | 12 |
| | Haze (%) t = 2.4 mm after conditioned at 80° C. | | — | 22 | 25 | 28 | 28 | 19 |
| | Charpy impact strength (kJ/m²) | | 10 | 14 | 13 | 12 | 12 | 1 |
| | Taber abrasion index | | 29 | 35 | 28 | 26 | 30 | 30 |

In the Table, SV denotes a single vent.
In the Table, TV denotes triple vents and DD denotes double Dulmage.

According to Table 4, in Examples II-1 to II-12, the outgas amounts were 1500 μg/g or less, surface resistivity values were $1 \times 10^{11} \Omega$ or less. From these, it is demonstrated that the molding materials are reduced in outgas generation and has excellent antistaticity, abrasion resistance and impact resistance, and thus useful as containers for semiconductor related components and the like. In addition, according to Examples II-3 to II-12, the obtained molded articles were excellent in transparency. Thus, the products of Examples above are suitable as molding materials for transparent containers. On the other hand, according to Table 5, Comparative Example II-1, in which no polyamide elastomer was used and degassing was not sufficiently performed, was inferior in outgas amount, surface resistivity, abrasion resistance and impact resistance. Comparative Example II-2, in which the amount of PA12 polyamide elastomer was beyond the range of the present invention, was inferior in outgas amount, abrasion resistance, transparency and impact resistance. Comparative Examples II-3 to II-6, in which PA6 polyamide elastomer was used and degassing was not performed sufficiently, were inferior in outgas amount, abrasion resistance, impact resistance and transparency.

INDUSTRIAL APPLICABILITY

The thermoplastic resin composition according to the present invention produces a small amount of outgas and has excellent antistaticity, and can provide molded articles excellent in transparency, abrasion resistance and impact resistance, and thus is useful for various applications in the electric/electronic fields. In particular, the thermoplastic resin composition of the present invention can be used as molding materials for resinous molded articles such as containers housing semiconductor related components such as semiconductor wafers, semiconductor related devices, liquid crystal related components and liquid crystal related devices, more specifically, wafer boxes, chip trays, and mask cases.

DESCRIPTION OF SYMBOLS

In the drawings, reference symbol 1 indicates a wafer box, 11 a lid, 12 a container main body, 13 wafer tray and 131 rib.

The invention claimed is:

1. A method for producing a thermoplastic resin composition having reduced outgas in an amount of 1000 μg/g or less and a surface resistivity value of $1\times10^{11}\Omega$ or less, comprising melt-kneading
   a styrenic resin (A), and
   a surface resistivity reducing substance (B) in an amount of 5 to 70 parts by mass relative to 100 parts by mass of the styrenic resin (A),
   in which said surface resistivity reducing substance (B) is a polyamide elastomer which comprises a hard segment comprising polyamide 12 and a soft segment comprising poly(alkylene oxide) glycol, said polyamide elastomer having a refractive index of 1.5 to 1.53, a melting point of 130 to 160° C., and a surface resistivity of $1\times10^8$ to $1\times10^{11}\Omega$, whereby said thermoplastic resin composition has said reduced outgas and said surface resistivity.

2. The method according to claim 1, in which said styrenic resin (A) is the following Component (A1) and/or the following Component (A2): Component (A1): a rubber-reinforced resin (A1) which is obtained by polymerizing a vinyl monomer (b) comprising a styrenic vinyl compound and optionally another vinyl monomer copolymerizable with the styrenic vinyl compound, in the presence of a rubbery polymer (a), and Component (A2): a copolymer (A2) which is obtained by polymerizing a vinyl monomer (b) comprising a styrenic vinyl compound and optionally another vinyl monomer copolymerizable with the styrenic vinyl compound, in the absence of the rubbery polymer (a).

3. The method according to claim 1, in which melt-kneading is carried out in an extruder under degassing.

4. The method according to claim 1, wherein the amount of outgas is reduced to 800 μg/g or less.

5. The method according to claim 1, wherein the outgas refers to gases that vaporize when a test sample of said thermoplastic resin composition is or an article molded therefrom is heated at 150° C. for 30 minutes.

6. The method according to claim 1, wherein the amount of outgas is quantified using mass spectrometry and gas chromatography having a retention time of 30 minutes.

7. The method according to claim 1, wherein the surface resistivity is determined by forming a disk-shaped resinous molded test sample from said thermoplastic resin composition, said sample having a diameter of 100 mm and a thickness of 2 mm that has been conditioned at 23° C. and 50% relative humidity for 7 days, and determining the surface resistivity of said test sample with an ultra-insulation resistance meter.

8. The method according to claim 1, wherein the outgas refers to gases that vaporize when a test sample of said thermoplastic resin composition is or an article molded therefrom is heated at 150° C. for 30 minutes and the amount of outgas is quantified using mass spectrometry and gas chromatography having a retention time of 30 minutes; the surface resistivity is determined by forming a disk-shaped resinous molded test sample from said thermoplastic resin composition, said sample having a diameter of 100 mm and a thickness of 2 mm that has been conditioned at 23° C. and 50% relative humidity for 7 days, and determining the surface resistivity of said test sample with an ultra-insulation resistance meter.

9. The method according to claim 1, wherein the polyamide 12 is obtained by ring opening a lactam having 12 carbon atoms.

10. The method according to claim 1, wherein the surface resistivity reducing substance (B) is in an amount of 5 to 60 parts by mass relative to 100 parts by mass of the styrenic resin (A).

11. The method according to claim 1, wherein the surface resistivity reducing substance (B) is in an amount of 13.6 to 33 parts by mass relative to 100 parts by mass of the styrenic resin (A).

12. A method for producing a resinous article having outgas in an amount of 1000 μg/g or less and a surface resistivity value of $1\times10^{11}\Omega$ or less, which comprises molding a resinous article from a thermoplastic resin composition comprising:
   a styrenic resin (A), and
   a surface resistivity reducing substance (B) in an amount of 5 to 70 parts by mass relative to 100 parts by mass of the styrenic resin (A),
   said thermoplastic resin composition having outgas in an amount of 1000 μg/g or less and a surface resistivity value of $1\times10^{11}\Omega$ or less,
   in which said surface resistivity reducing substance (B) is a polyamide elastomer which comprises a hard segment comprising polyamide 12 and a soft segment comprising poly(alkylene oxide) glycol, said polyamide elastomer having a refractive index of 1.5 to 1.53, a melting point of 130 to 160° C., and a surface resistivity of $1\times10^8$ to $1\times10^{11}\Omega$,
   whereby said thermoplastic resin composition has said reduced outgas and said surface resistivity.

13. The method according to claim 12, in which the molded resinous article has a taber abrasion index of less than 30.

14. The method according to claim 13, wherein the molding comprises molding to a form container for receiving at least one selected from the group consisting of a semiconductor related component, a semiconductor related device, a liquid crystal related component and a liquid crystal related device.

15. The method according to claim 12, wherein the molding comprises molding to form a container for receiving at least one selected from the group consisting of a semiconductor related component, a semiconductor related device, a liquid crystal related component and a liquid crystal related device.

16. The method according to claim 12, wherein the amount of outgas is reduced to 800 μg/g or less.

17. The method according to claim 12, wherein the outgas refers to gases that vaporize when a test sample of said thermoplastic resin composition is or an article molded therefrom is heated at 150° C. for 30 minutes.

18. The method according to claim 12, wherein the amount of outgas is quantified using mass spectrometry and gas chromatography having a retention time of 30 minutes.

19. The method according to claim 12, wherein the surface resistivity is determined by forming a disk-shaped resinous molded test sample from said resinous composition, said sample having a diameter of 100 mm and a thickness of 2 mm that has been conditioned at 23° C. and 50% relative humidity for 7 days, and determining the surface resistivity of said test sample with an ultra-insulation resistance meter.

20. The method according to claim 12, wherein the outgas refers to gases that vaporize when a test sample of said thermoplastic resin composition is or an article molded therefrom is heated at 150° C. for 30 minutes and the amount of outgas is quantified using mass spectrometry and gas chromatography having a retention time of 30 minutes; the surface resistivity is determined by forming a disk-shaped resinous molded test sample from said thermoplastic resin composition, said sample having a diameter of 100 mm and a thickness of 2 mm that has been conditioned at 23° C. and 50% relative humidity for 7 days, and determining the surface resistivity of said test sample with an ultra-insulation resistance meter.

21. The method according to claim 12, wherein the polyamide 12 is obtained by ring opening a lactam having 12 carbon atoms.

22. The method according to claim 12, wherein the surface resistivity reducing substance (B) is in an amount of 5 to 60 parts by mass relative to 100 parts by mass of the styrenic resin (A).

23. The method according to claim 12, wherein the surface resistivity reducing substance (B) is in an amount of 13.6 to 33 parts by mass relative to 100 parts by mass of the styrenic resin (A).

* * * * *